United States Patent
Reeder et al.

(10) Patent No.: US 8,220,859 B2
(45) Date of Patent: Jul. 17, 2012

(54) HOLD-DOWN LOCKING MECHANISM FOR A FLEXIBLE COVER SYSTEM

(75) Inventors: Ryan Reeder, Carmel, IN (US); John Vogel, Columbus, IN (US); Donald Prince, Franklin, IN (US)

(73) Assignee: Aero Industries, Inc., Indianapolis, IN (US)

( * ) Notice: Subject to any disclaimer, the term of this patent is extended or adjusted under 35 U.S.C. 154(b) by 254 days.

(21) Appl. No.: 12/755,006

(22) Filed: Apr. 6, 2010

(65) Prior Publication Data

US 2010/0253111 A1    Oct. 7, 2010

Related U.S. Application Data

(60) Provisional application No. 61/167,055, filed on Apr. 6, 2009.

(51) Int. Cl.
*B60J 11/00* (2006.01)
*B60P 7/04* (2006.01)

(52) U.S. Cl. ........................................................ 296/98

(58) Field of Classification Search ................ 296/98, 296/100.01, 100.11, 100.12, 100.13, 100.14, 296/100.15, 100.16
See application file for complete search history.

(56) References Cited

U.S. PATENT DOCUMENTS

| 4,505,512 | A  | * | 3/1985 | Schmeichel et al. | 296/98 |
|---|---|---|---|---|---|
| 5,125,713 | A  | * | 6/1992 | Willingham et al. | 296/98 |
| 5,984,379 | A  | * | 11/1999 | Michel et al. | 296/100.16 |
| 6,338,521 | B1 |   | 1/2002 | Henning | |
| 6,478,361 | B1 | * | 11/2002 | Wood | 296/98 |
| 6,513,856 | B1 | * | 2/2003 | Swanson et al. | 296/98 |
| 6,595,594 | B2 | * | 7/2003 | Royer | 296/98 |
| 6,805,395 | B2 | * | 10/2004 | Royer | 296/98 |
| 7,296,842 | B2 |   | 11/2007 | Growcock et al. | |
| 2003/0052506 | A1 | * | 3/2003 | Royer | 296/98 |
| 2004/0000798 | A1 | * | 1/2004 | Royer | 296/98 |
| 2011/0198880 | A1 | * | 8/2011 | Chenowth | 296/98 |

* cited by examiner

*Primary Examiner* — H Gutman
(74) *Attorney, Agent, or Firm* — Maginot, Moore & Beck, LLP (57) ABSTRACT

A locking mechanism is provided for a tarping system having a flexible cover carried by a deployment mechanism having a horizontal arm spanning the width of a container, the deployment mechanism movable to an extended position in which the horizontal arm is adjacent one end of the container. The locking mechanism includes at least one locking element associated with one end of the container and at least one latching element having a latching portion configured to engage the at least one locking element. The latching element is pivotably supported on the horizontal arm so that that latching element can pivot to and from a locked position in which the latching portion engages the at least one locking element. A tension element is connected between the latching element and the cover to control the pivoting of the latching element under the force of gravity based on the position of the flexible cover.

32 Claims, 12 Drawing Sheets

HOLD-DOWN LOCKING MECHANISM FOR A FLEXIBLE COVER SYSTEM

REFERENCE TO RELATED APPLICATION

This application claims priority to co-pending provisional application No. 61/167,055, filed on Apr. 6, 2009 in the name of the present inventors. The entire disclosure of this provisional application is incorporated herein by reference.

BACKGROUND

The present invention relates to flexible covers or tarping systems for open-topped containers and particularly concerns a mechanism for restraining the flexible cover or tarp on the container.

Many hauling vehicles, such as dump trucks, include open-topped containers used for hauling or storing various materials. In a typical dump truck application, the dump body is used to haul a variety of particulate material, such as gravel and the like, as well as organic materials, such as grain or produce.

Depending upon the nature of the materials stored in the open-topped container, it is often desirable to provide a cover for the container. A cover is particularly valuable when the containers are part of a vehicle, such as a dump truck. Rigid covers are well known that may be hinged from one end of the container body and pivoted from an open to a closed position. While rigid covers may be acceptable for stationary containers, the same is usually not true for land vehicles. In this industry, the rigid covers have given way to flexible cover systems. Systems of this type utilize a flexible tarpaulin that can be drawn from a stowed position at one end of the container, to a deployed position covering the open top of the vehicle container or bed. The flexible cover or tarpaulin is preferable in this arena because it can be easily stowed when the cover is not necessary, such as when a dump truck is being loaded or emptied. In addition, the flexible cover is generally easier to deploy than a rigid cover.

Figure 1:
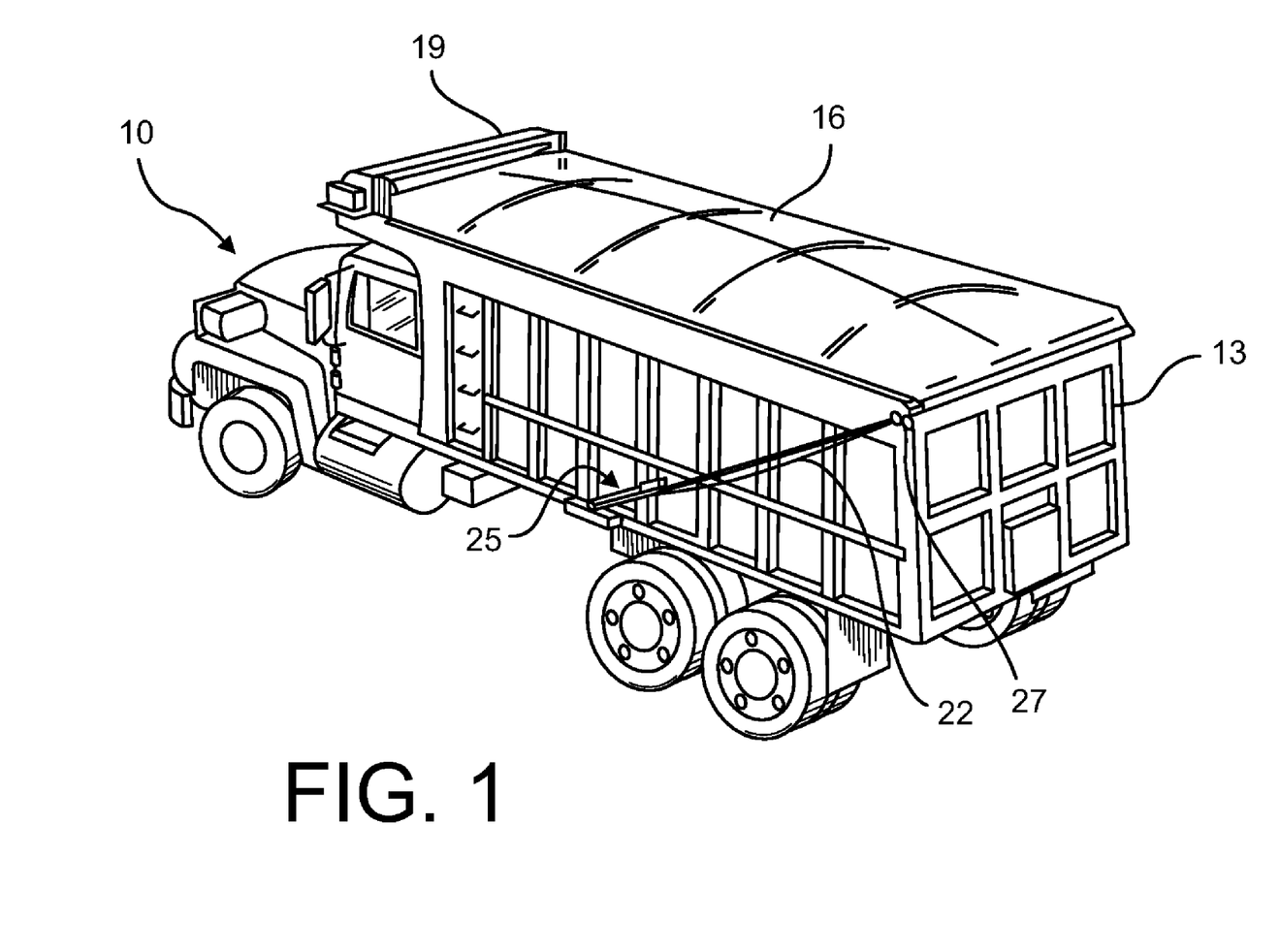
FIG. 1 is a top perspective view of a hauling vehicle utilizing a flexible tarping system.

A variety of flexible cover or tarping systems have been developed that are geared toward particular hauling vehicle applications. One such tarping system is the Easy Cover® Tarping System manufactured and sold by Aero Industries, Inc. An example of one form of the Easy Cover® Tarping System is shown in FIG. 1. The system includes a tarp deployment mechanism in the form of a U-shaped bail member 22 that is connected at a pivot mount 25 to the base of the container body 13 on vehicle 10. The horizontal section of the U-shaped bail is attached to the tarp 16. The tarp 16 can be preferably stowed by winding onto a tarp roller 19 at the forward end of the vehicle.

The pivot mount 25 and the tarp roller 19 can be of a variety of configurations that permit manual or powered deployment. In one typical installation the pivot mount 25 includes a torsion spring pack that is biased to rotate the bail member 22 (clockwise in the figure) to pull the tarp 16 over the top of the container 13. The tarp roller 19 is biased to resist this rotation of the bail member. In some versions, a manual crank rotates the tarp roller 19 to allow the tarp 16 to unfurl under the torsion force of the spring pack. In other versions, a motor controls the rotation of the tarp roller. The manual crank or motor are rotated in the opposite direction to pull the bail member 22 toward the front of the container body 13 and to thereby stow the tarp 16 in its open position.

One problem that is persistently faced with tarping systems of the type shown in FIG. 1 is the effect of air flow or wind as the vehicle is traveling. This problem becomes especially acute at high speeds. The tarpaulin 16 is affected in a number of ways by the air flow across a traveling vehicle. The front end of the vehicle creates turbulent air flow that travels along the length of the container body 13. This turbulence, which can be manifested by air vortices along the top of the container body, has a tendency to lift the flexible cover away from the top of the body.

Another problem is simply road vibration and shock, which can cause the bail member 22 to bounce on the back of the container body 13 when deployed. The problem is especially noticeable for systems in which the pivot mount utilizes a biased torsion spring pack. When the tarp is fully deployed, as shown in FIG. 1, the spring force is much less than when the tarp is stowed. This lower spring torsional force is unable to prevent the bail member from bouncing due to road shock or vibration.

This action of the tarp and bail member due to wind and vibration effects can be very noisy. The most deleterious effect is on the flexible tarping system itself. The constant flapping and bouncing can gradually wear the tarp and the tarping system components down, which decreases the longevity of the tarping system. In addition, when the tarp 16 is dislodged from its deployed position, the contents of the container body 13 are at risk of expulsion.

In order to address this problem, various systems have been devised to hold the tarp down against the container body. In one common system, a web of cords is deployed over the tarp cover 13 along the length of the container body. The ends of the cords can be attached to mounts fixed to the side of the body. In other systems, the bail member includes a tie down that can be manually attached to mounts at the rear of the body.

Still other systems rely upon a complicated array of mechanical, electrical or hydraulic structures to apply a constant tension along the length of the tarp. However, in most cases, the tension along the length of the tarp does not alleviate the problem of bellowing of the side edges of the tarp or bouncing of the bail member. In one approach shown in FIG. 1, the bail member 22 is seated within brackets 27 mounted to the rear of the container 13.

The prior approaches either require manual intervention or require sophisticated powered components to lock the bail arm in the deployed condition. There remains a need for a tarping system with a locking mechanism that is automatically operated to both lock and unlock the tarp from its deployed position.

SUMMARY

According to one embodiment, a locking mechanism is provided for a tarping system covering a container that is operable by the force of gravity and controlled by the tension in the tarp. The flexible tarp is carried by a deployment mechanism having a horizontal arm spanning the width of the container that is movable to an extended position in which the horizontal arm is adjacent one end of the container. The locking mechanism comprises at least one locking element associated with one end of the container, and at least one latching element having a latching portion configured to engage the at least one locking element. The latching element may be a latch plate pivotably supported on the horizontal arm of the deployment mechanism so that the latch plate can pivot to and from a locked position in which the latching portion engages the at least one locking element.

In a specific embodiment, the at least one locking element is a post fastened to the container at one end of the container. In certain embodiments the post projects outward from a side of each side of the container, while in other embodiments the post projects inward inside the container or rearward from the back of the container. The latching portion of the latch plate is a hook configured to engage the post. In a further feature, at least one tensioning member is connected between the at least one latching element and the flexible tarp. The tensioning member is arranged to pivot the latch plate away from the locked position when the tarp is retracted or withdrawn from the end of the container, and to permit the latch plate to pivot toward the locked position when the tarp is deployed toward the end of and covering the container. In a specific embodiment, the tensioning member includes a pair of elongated straps fastened at one end to the flexible tarp and configured at the opposite end for connection to the latching element. The connection between the elongated straps and the latching element can be by way of a shaft pivotably connected to the latch plate, with the straps connected to the shaft, such as by a looped end.

In one aspect, the at least one locking element includes a pair of posts, one each projecting outward from each side of the container. Similarly, the at least one latching element may include a pair of latch plates, one each pivotably supported adjacent each end of the horizontal arm at each side of the container. The latching portion of each of the pair of latch plates is a hook configured to engage a corresponding one of the pair of posts.

According to a method disclosed herein, the latching element is pivotable about the horizontal arm of the deployment mechanism by the force of gravity. The pivoting or rotation of the latching element is controlled by a tensioning element, which in turn is responsive to position of the flexible tarp. As the deployment mechanism is actuated the horizontal arm is gradually pivoted toward its extended position. The tarp is maintained in tension as it is deployed or pulled rearward by the mechanism. This tension is transmitted by the tensioning member as a tension force to the latching element to pull or pivot the latching element away from the position for locking engagement with the locking element or post as the tarp advances to its deployed position. This tension is maintained as the deployment mechanism nears the end of its stroke so that the latching portion, such as a hook portion, clears the locking post.

In a further aspect, when the horizontal bar of the deployment mechanism reaches the end of its travel, such as by contacting the end of the container, the tension in the tarp decreases so that the tarp "relaxes" or "bunches". This in turn allows the tensioning member to permit pivoting of the latching element under the force of gravity until the latching element engages the locking post.

In still another feature, the locking mechanism automatically unlocks when the deployment mechanism is activated to withdraw from the extended position. As the deployment mechanism is retracted, the tarp is pulled into tension. This tension is transmitted by the tensioning members to the latching element to pivot the latching element away from engagement with the locking post.

Other features and benefits of the present invention can be discerned from the following written description and accompanying figures.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Figure 2:
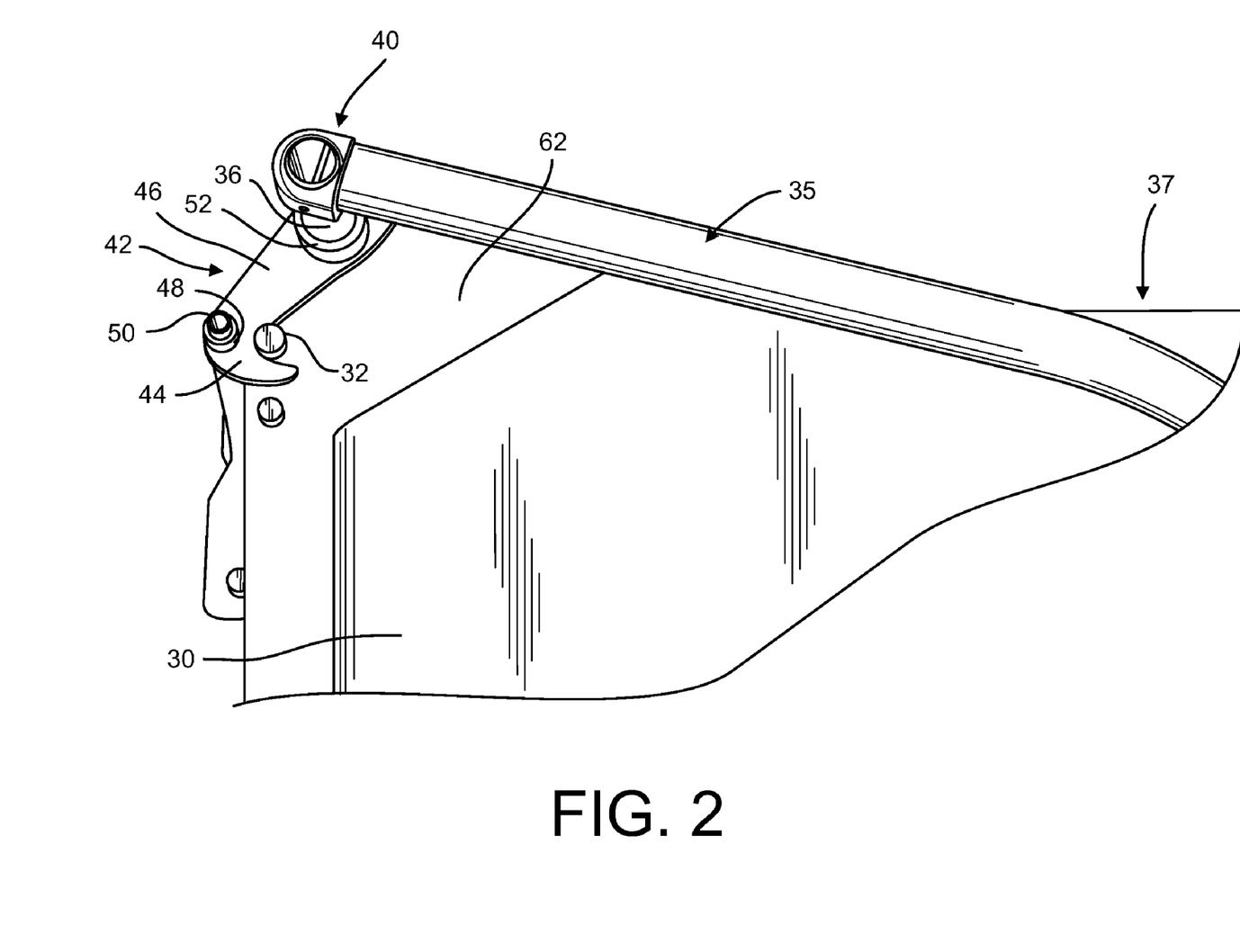
FIG. 2 is a side view of a locking mechanism according to one embodiment of the present invention.
Figure 3:
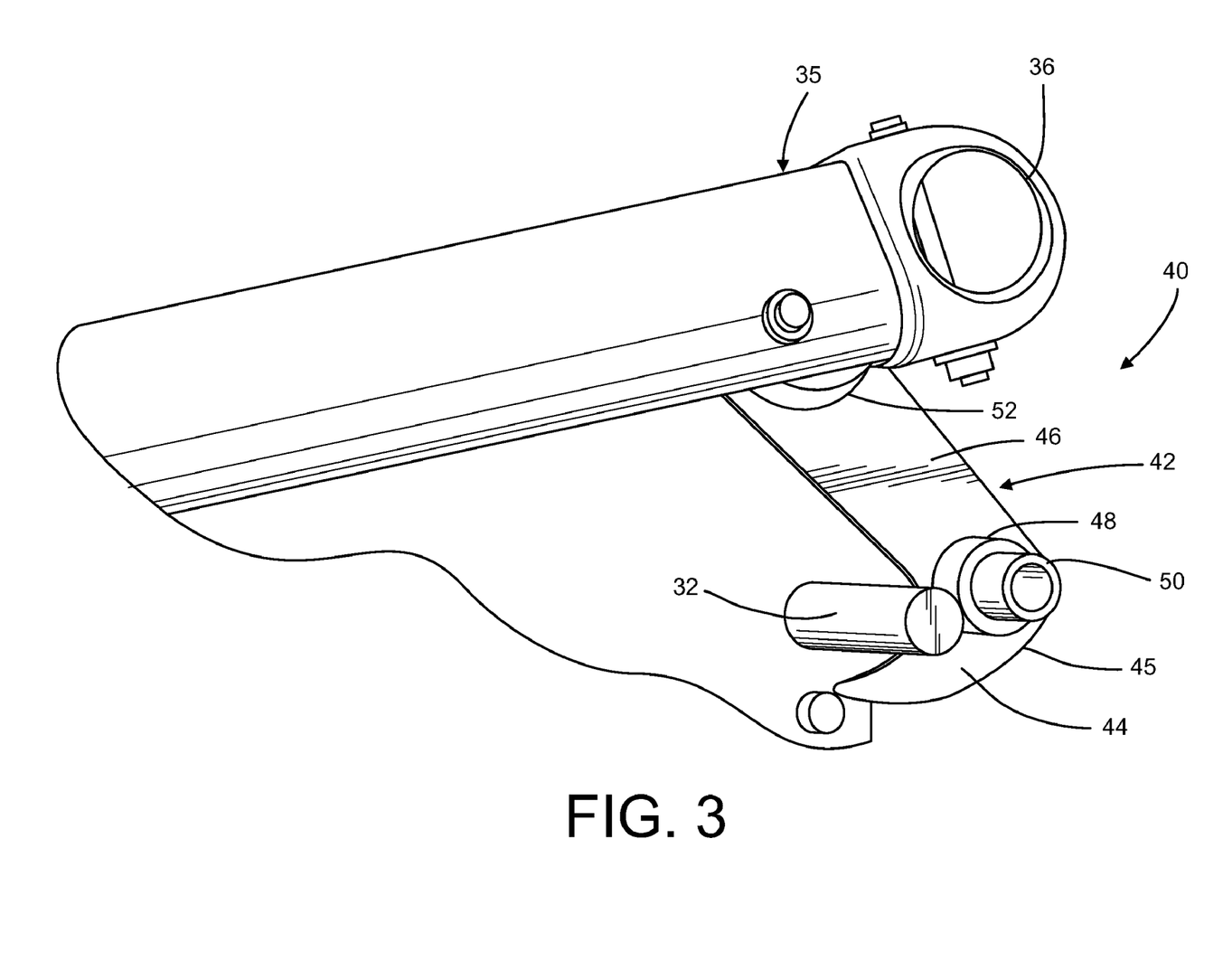
FIG. 3 is an enlarged view of the locking mechanism shown in FIG. 2, with the mechanism in a locked position.
Figure 4:
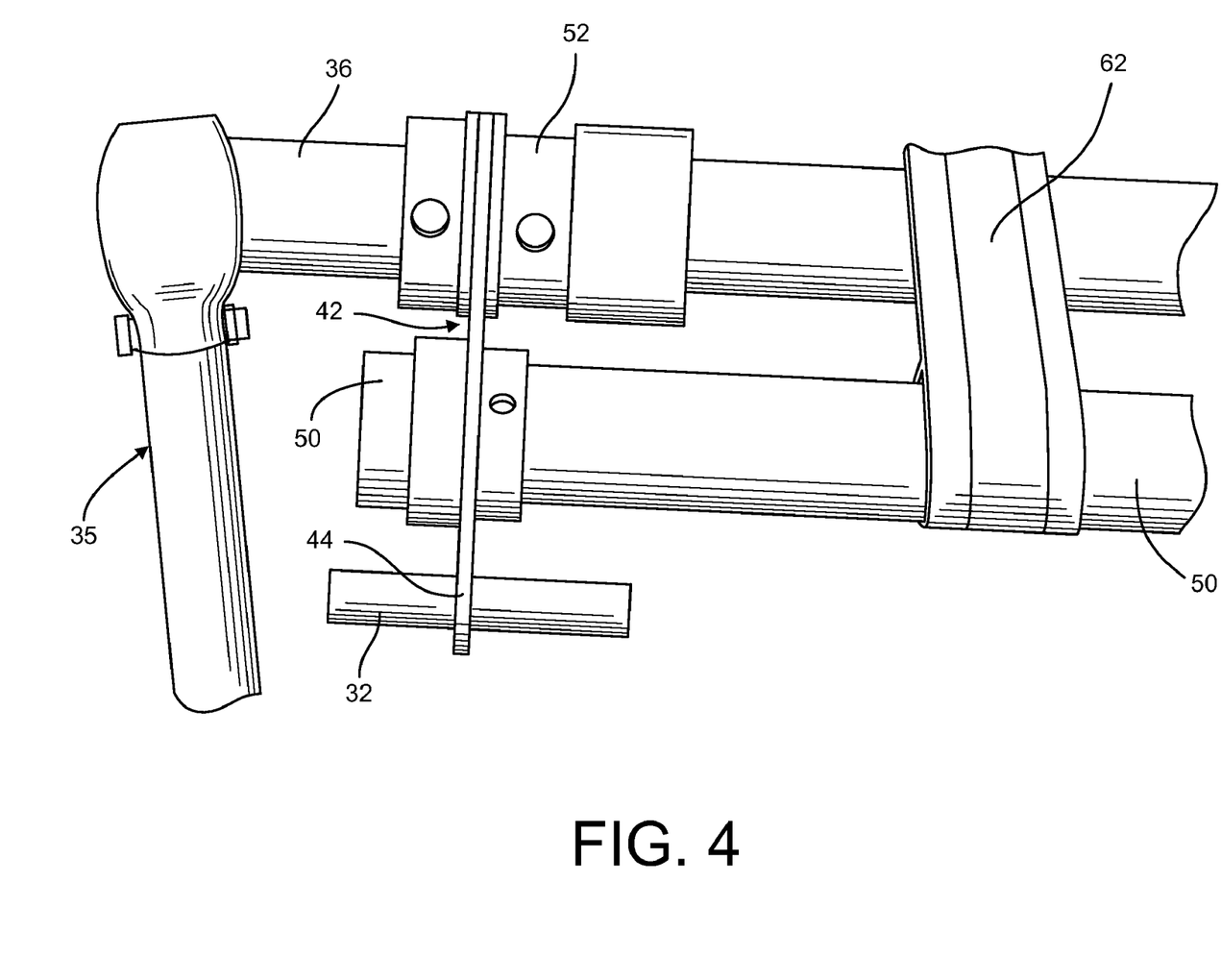
FIG. 4 is a rear view of the locking mechanism shown in FIGS. 2-3.

In accordance with one embodiment of the invention, a tarp locking mechanism 40, shown in FIGS. 2-6, is provided for locking a flexible tarping system, such as the system shown in FIG. 1, in which the tarp 16 is moved by a deployment mechanism to and from a position in which the tarp covers or spans the length of the container. The latch mechanism includes a latching element 42 that is configured to engage a locking element associated with the end of the container body 30. In one embodiment, the locking element is a post 32 extending from the side of the container body 30. In certain embodiments, the latching element 42 defines a hook 44 that is curved to wrap around and underneath the post 32 when the tarp 37 is deployed, as best seen in FIGS. 2-3. This orientation of the latch hook 44 restrains the bail member assembly 35 from vertical movement that might otherwise occur due to wind forces or road shock/vibration. As shown in the figures, the latching element may be in the form of a plate.

A latching element 42 is provided on each of the opposite sides of the container body 30. The two latches may be connected by a corresponding mounting collar 48 to a tensioning shaft 50 that spans the width of the container body.

Figure 6:
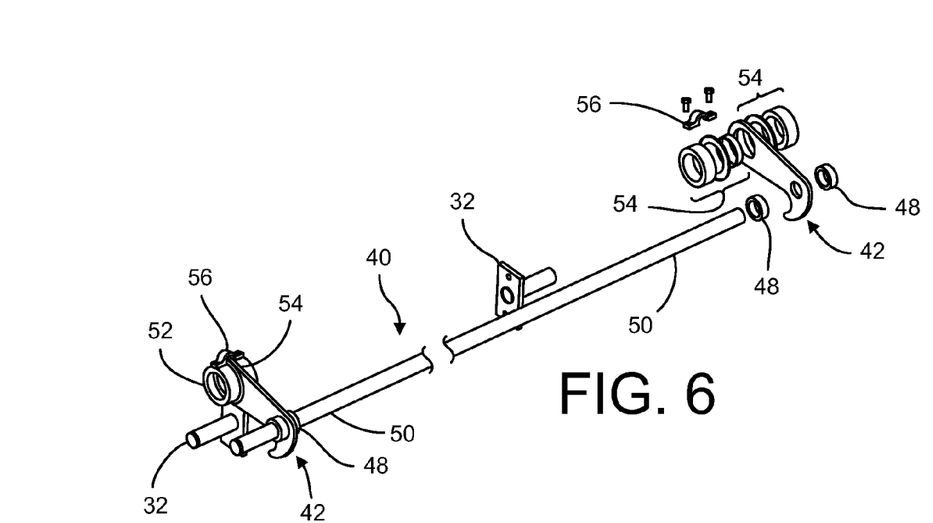
FIG. 6 is an exploded view of the components of the locking mechanism shown in the prior figures.

The latching element s 42 are connected to the deployment mechanism for the tarping system. In the illustrated embodiment, the latching element s are supported on the bail member assembly 35, and particularly on the horizontal bar 36 spanning between opposite bail members of the assembly 35. The latching element s thus include a link plate 46 that may be integral with the latch hook 44 and is preferably oriented generally perpendicular to the hook. Each link plate 46 is pivotably mounted to the horizontal bar 36 of the bail member assembly 35 by a bail arm mount 52. In one embodiment, the bail arm mount may include a bearing and thrust washer assembly 54 that is held together by a retainer bracket 56, as best seen in FIG. 6. Each link plate 46, and consequently each latching element 42, is thus able to rotate about the horizontal bar 36 as the deployment mechanism, or bail member assembly 35, rotates toward the rear of the container body 30.

Figure 5:
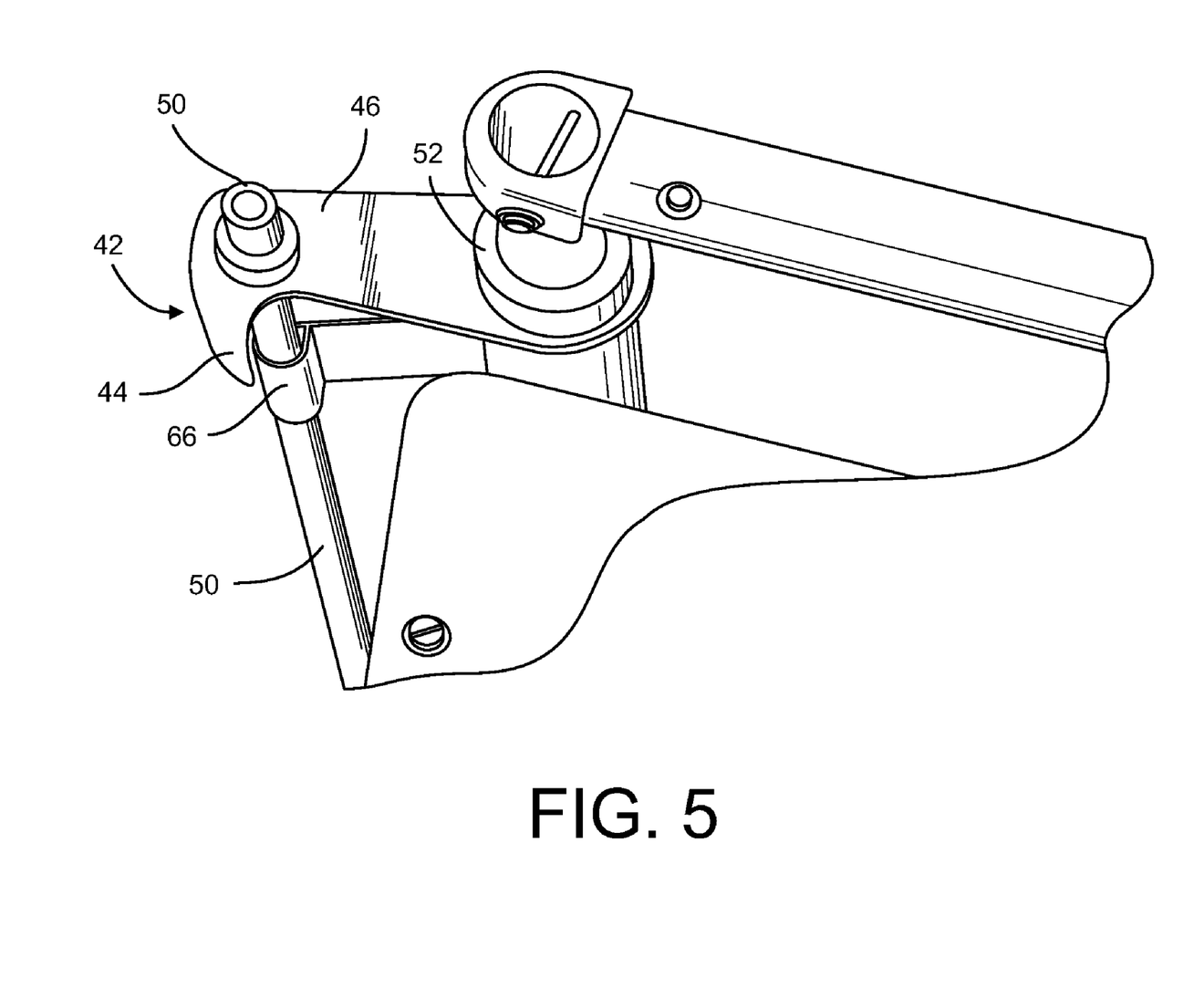
FIG. 5 is an enlarged side view of the locking mechanism shown in FIGS. 2 and 4 with the mechanism in an un-locked position.

It can be appreciated that the locking mechanism 40 is carried by the bail member assembly 35 as the assembly is pivoted from its stowed position to its deployed position spanning the top of the container body, such as the body 13 shown in FIG. 1. As the bail member assembly, and more particularly the horizontal bar 36, nears the end of the container with the tarp, such as tarp 16, covering the load, the link plate 46 of the latch 42 is generally horizontal, as shown in FIG. 5. As the bail member assembly 35 continues to pivot to its deployed position, the link plate 46 pivots further relative to the bail member bar 36 until it engages the latch post 32, as shown in FIGS. 2-3.

The locking mechanism 40 may rely upon a gravity assist to pivot the latch into its final engagement with the locking post 32. In certain embodiments, the latch hook 44 may be provided with a curved outer edge 45 that can ride against the post 32 as the latching element 42 drops into position. The tensioning shaft 50 not only provides rigidity to the locking mechanism, it also ties toe two latching element s to the same angular movement. In addition, the tensioning shaft 50 adds weight to the mechanism that provides the gravity assist and resists dislodgment of the latching element 42 from the post 32 when in the locked position.

Figure 7:
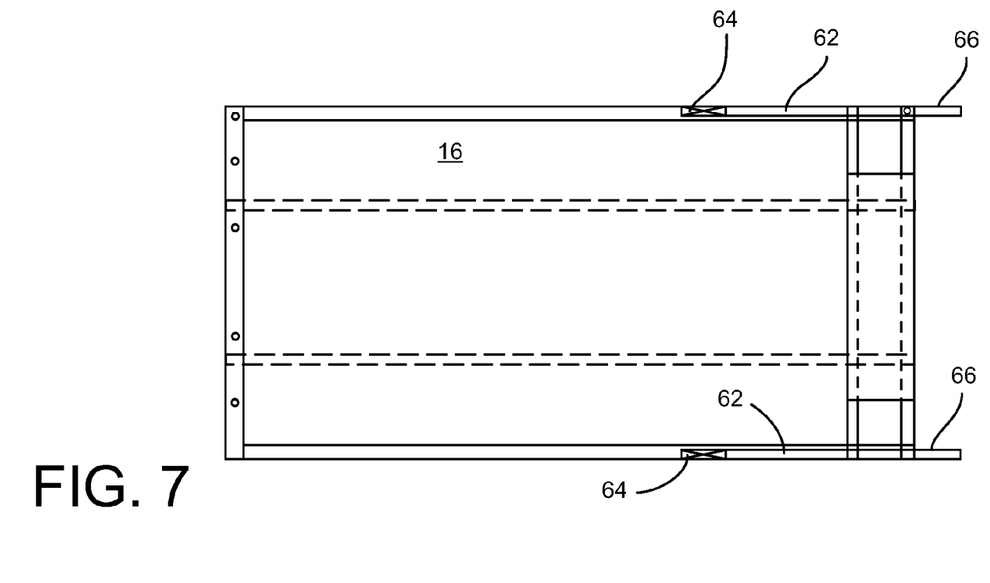
FIG. 7 is a plan view of a tarp configured for use with the locking mechanisms disclosed herein.

In a further aspect of the locking mechanism 40, the latching element 42 is retracted and deployed in a controlled manner by a connection with the tarp 60 itself. In particular, as shown in FIG. 7, at least two pull straps 62 are fastened at one end 64 to the tarp 60. In the illustrated embodiment the connection end 64 of each strap is fastened to the tarp 60 at a position that is about two-thirds the length of the tarp 60. In some embodiments, the pull straps 62 may extend along the entire length of the tarp, provided that the portion of the pull straps adjacent the end of the tarp carried by the horizontal bar 36 is free—i.e., from the connection end 64 rearward. The connection end 64 may be sewn to the tarp or connected in some other suitable manner.

The free end 66 of each strap 62 extends beyond the end of the tarp, as shown in FIG. 7. The end 66 may be fastened to the shaft in a suitable manner (such as by a screw or similar fastener). Alternatively, the end 66 of each strap may terminate in a loop that is wrapped around the tensioning shaft 50. The loop may be a continuous closed loop or may be formed by opposing portions that are coupled together about the shaft 50, such as by a hook and loop fastener. The hook and loop fastener allows the length of the loop to be adjusted to provide a proper fit of the tensioning element. The length of each strap 62 from the connection end 64 to the free end 66 is sufficient to allow the latching element 42 to pivot fully to its locked position in engagement with the locking post 32. Similarly, the length that the free end 66 extends beyond the end of the tarp is also sufficient to allow the latching element to reach its locked position.

When the tarp 60 is deployed the bail member assembly 35 pivots toward the rear of the container body 30. The tarp 60 is maintained in tension as it is pulled rearward by the bail member assembly. The pulls traps 62 are always in tension as the bail member assembly is being deployed due to the force of gravity on the latching element 42. The tarp tension maintains the pull straps 62 in fixed relation to the tarp, which in turn tends to keep the latching element 42 in its upward position shown in FIG. 5. When the bail member assembly reaches the end of its travel the horizontal bar 36 contacts the rear of the container body 30. At this point, the tarp 60 is still in tension.

As the tarp 60 is unrolled further from the tarp roller (such as roller 19 at the front of the container body), the tarp slackens or "bunches" as the tension in the tarp decreases. The weight of the locking mechanism 40, and especially the tensioning shaft 50, pivots the latching element 42 rearward, which pulls the straps 62 rearward. Since the tarp is slack, the straps 62 can move rearward with the pivoting latching element. The weight of the locking mechanism maintains the pull straps in tension until the latch hook 44 engages the locking post 32, as shown in FIG. 3. The weight of the locking mechanism may be sufficient to keep the latch hook firmly engaged with the locking post even under significant road shock or vibration.

The locking mechanism 40 is also configured to automatically disengage when the tarp 60 is being moved to its stowed position. As the tarp roller pulls on the tarp 60, any slack in the tarp 60 and pull straps 62 is taken up. Once the slack is removed, the weight of the locking mechanism again places the pull straps in tension. As the tarp is pulled further forward (toward the front of the container body 30), any remaining slack in the tarp is removed, which thus pulls the pull straps forward. This forward movement of the pull straps 62 pulls the latching element 42 upward to rotate the latching element back to the position shown in FIG. 5 so that the hook 44 disengages the locking post 32. The latching element 42 is preferably rotated upward sufficiently to avoid any contact with the container body 30 or the load contained therein as the bail member assembly is pivoted forward.

In one embodiment, the latching element s 42 may be positioned outboard of the side walls of the container. Alternatively, the latching element s may positioned within or inboard of the side walls of the container. In this alternative, the locking posts 32 are appropriately positioned within the container. In yet another alternative, the locking posts are positioned on a rear wall of the container with the latching element s suitably configured to engage the posts.

The locking mechanism 40 of the present invention is capable of automatic engagement and disengagement. The mechanism does not require any complex linkage arrangements or any powered component, relying instead on gravity in certain embodiments. In alternative embodiments, the pivoting of the latching element 42 may be manually assisted, or a magnetic element may between the latching element 42 and the locking to assist the pivoting and locking action. The locking mechanism can be easily retrofitted to any existing tarping system without requiring any modification to the tarp, the bail member assembly or the components for deploying and retracting the tarp.

Various modifications to the illustrated embodiment are contemplated. For instance, while two pull straps 62 are shown in the figures, one or more straps may be used. The tensioning shaft 50 is shown as extending across the entire width of the container body. However, stub shafts may be used in lieu of the single shaft, with the pull strap end loops engaged to each stub shaft. It is further contemplated that a positive locking component may be added to prevent accidental dislodgement of the latch hook from the locking post. This positive locking component may be connected to the pull straps to be automatically released as the tarp is retracted.

A latch mechanism 100 is shown in FIGS. 8-14 which includes a latching element 101 having a hook 102 similar to the latching element 52 and hook described above. The hook 102 engages a locking element associated with one end of the container body. In one embodiment, the locking element is a post 120 mounted to the body 30, such as by a mounting plate 121. The latching element 102 may further include the curved outer edge 103 that can ride along the post 120 as the latching element moves to its locked position, similar to the latching element 42 described above.

Figure 8:
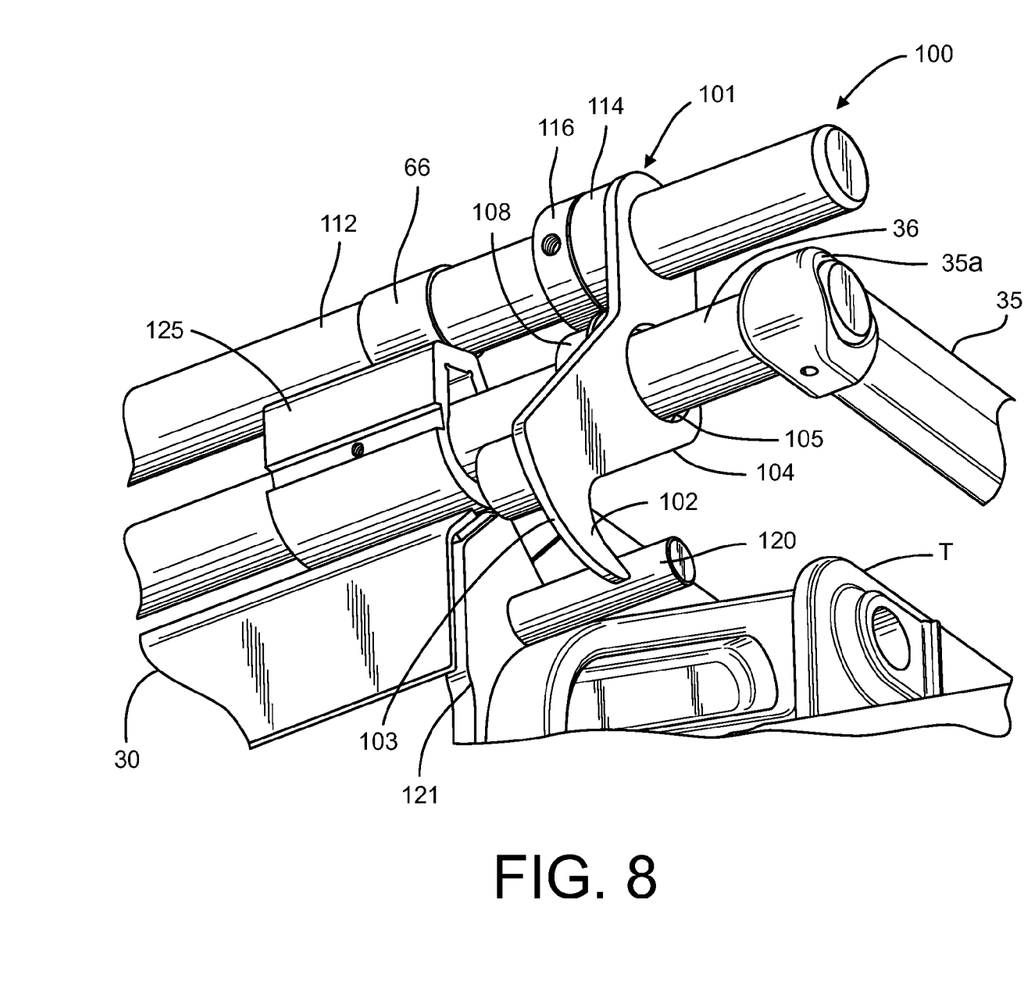
FIG. 8 is a side view of a locking mechanism according to another embodiment of the invention, with the mechanism in an un-locked position.
Figure 9:
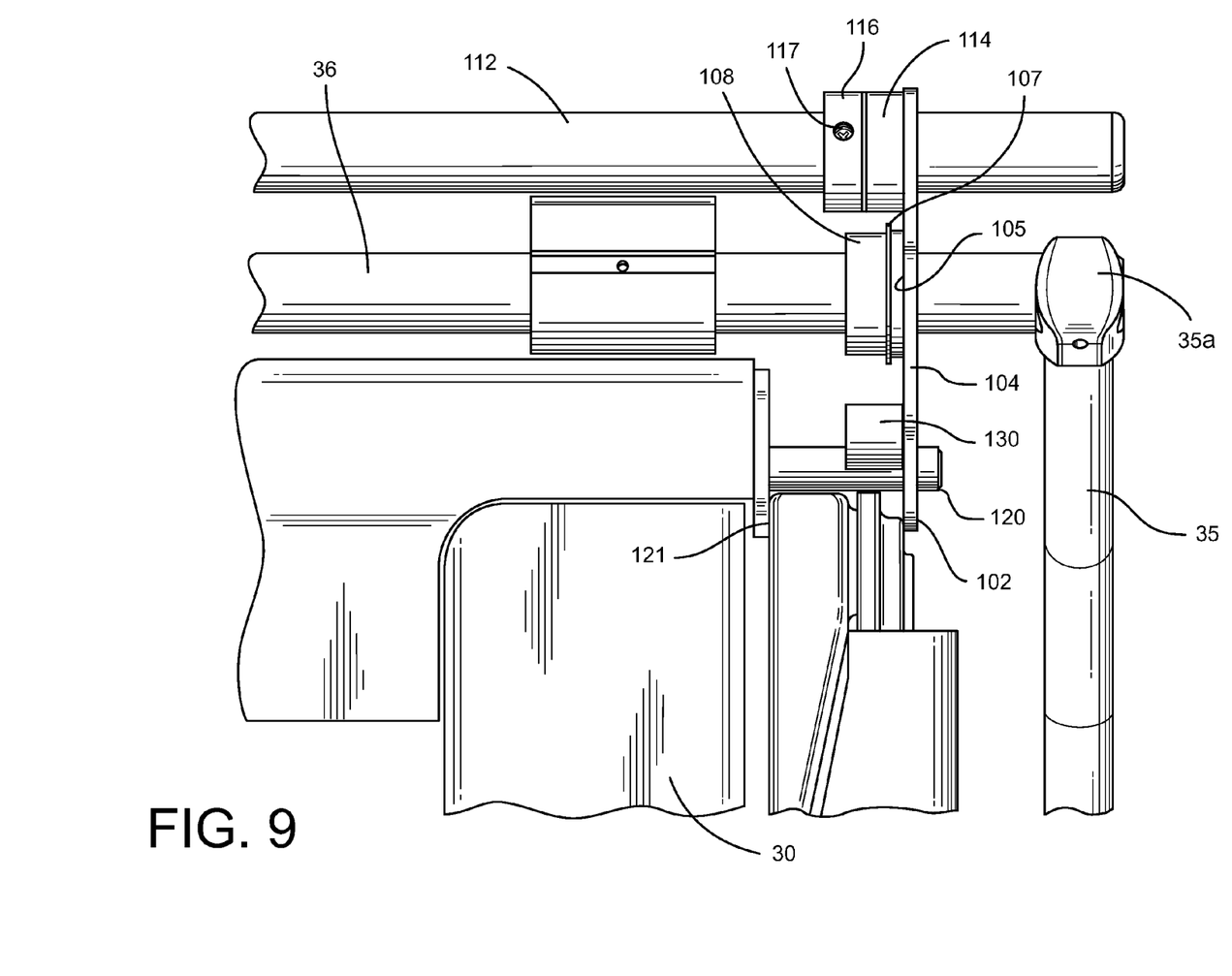
FIG. 9 is a rear view of the locking mechanism shown in FIG. 8.
Figures 13, 14:
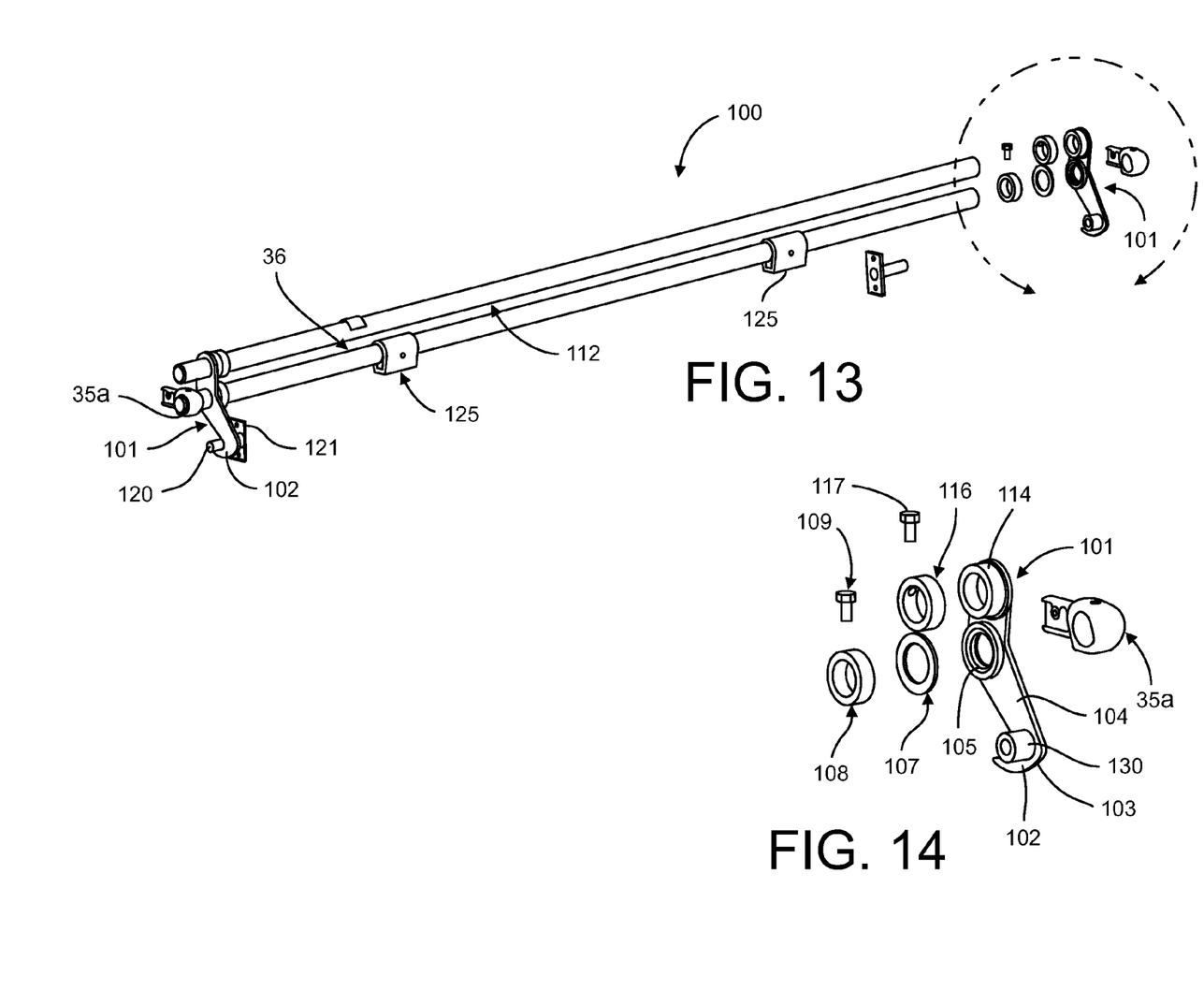
FIG. 13 is an exploded view of the components of the locking mechanism shown in FIG. 8.
FIG. 14 is an enlarged view of components shown in FIG. 13.

In the locking mechanism 40 of the embodiment of FIG. 2, the latching element 42 essentially pivots about the horizontal bar 36 as the bail member assembly is extended and retracted. In the embodiment shown in FIG. 8, the latching element 101 likewise pivots about the horizontal bar 36 of the bail member assembly 35. Thus, the latching element 101 may include a link plate 104 that defines a pivot bore 105 through which the horizontal bar 36 extends. As shown in FIGS. 9 and 13, the link plate is sandwiched between a thrust washer 107 and a shaft collar 108 at one side and the bail arm end piece 35a on the other side. The bail arm end piece 35a is affixed to the bail member assembly in a conventional manner and includes an inner bore to receive an end of the horizontal bar 36 in a known manner. The shaft collar 108 is fixed to the bar 36 by a locking screw 109 so that the link plates 104 at each end of the bar cannot slide along the axis of the horizontal bar 36.

The link plates 104 further define a pivot mount collar 114 at the end opposite the latch hook 102. This collar 114 is used to pivotably support the tensioning shaft 112. A shaft collar 116 and locking screw 117 may be fixed to the tensioning shaft 112 so that the shaft 112 cannot slide along its axis relative to the link plates 104 at each end of the shaft.

It can be appreciated that the tarp, such as the tarp 60 shown in FIG. 7, can be carried by the horizontal bar 36 of the bail member assembly 35 in a known manner. In addition, as with the embodiment shown in FIG. 5, the end loops 66 of the pull straps 62 may be engaged about the tensioning shaft, as depicted in FIG. 8. The pull straps can thus function in the manner described above. In particular, the weight of the tensioning shaft 112 maintains the straps 62 (not shown) in tension as the bail member assembly 35 is pivoted rearward to the deployed position. With the pull straps in tension, the tensioning bar holds the link plate 104 in the position shown in FIG. 8 with the latch hook 102 held clear of the post 120.

Figure 10:
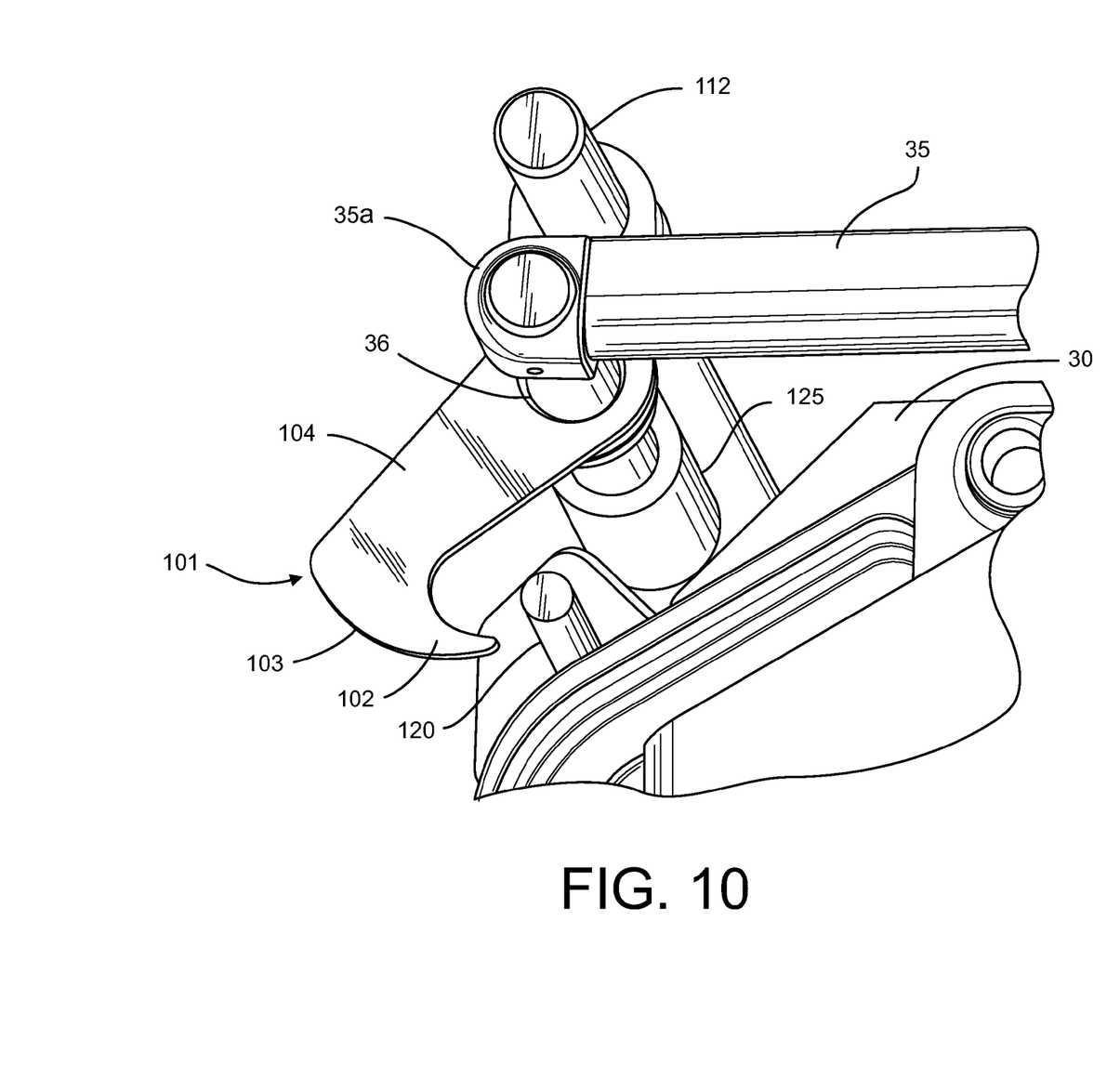
FIG. 10 is a side view of the locking mechanism shown in FIG. 8, with the locking mechanism in a locked position.
Figure 11:
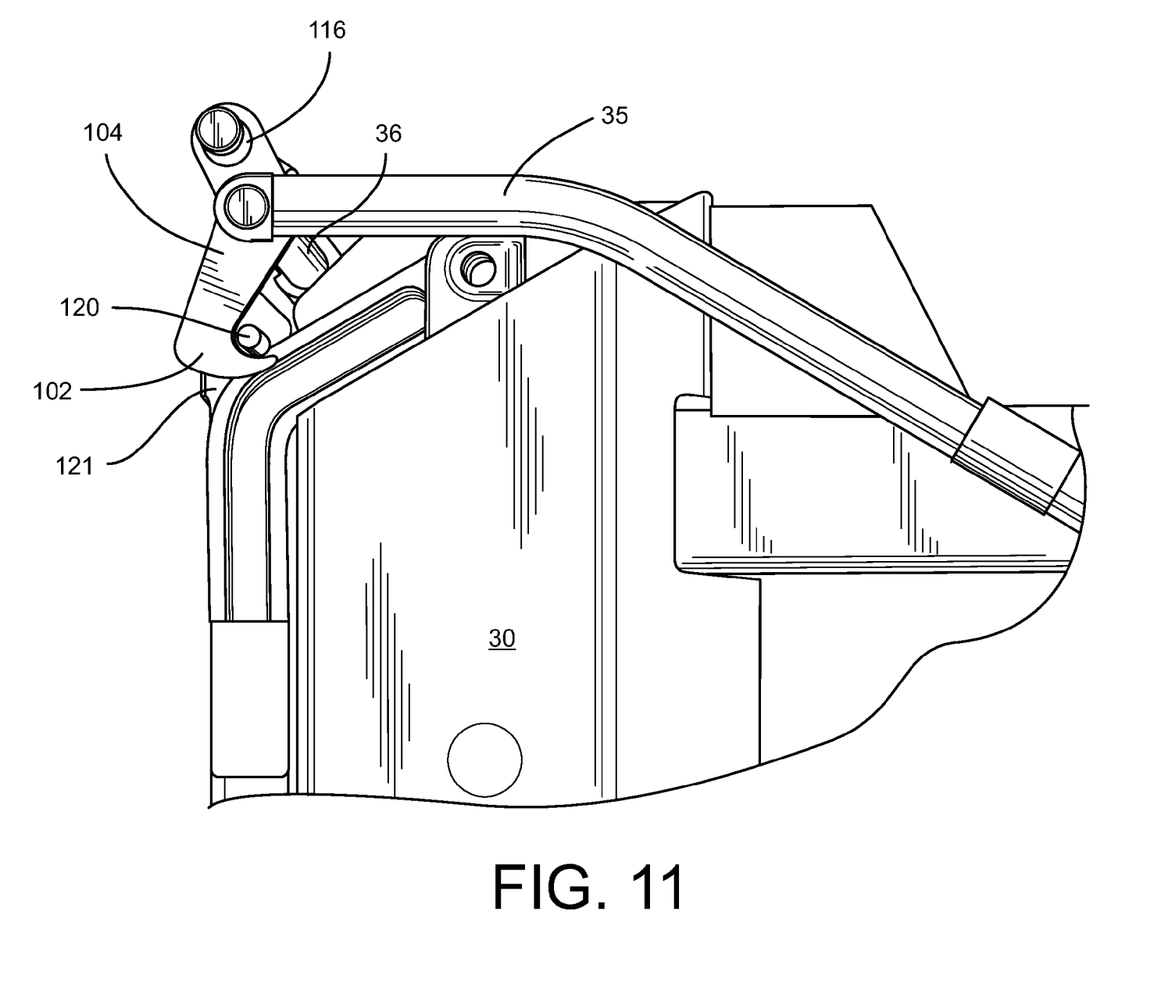
FIG. 11 is a side view of the locking mechanism shown in FIG. 8 with the mechanism in a locked position.

As the bail member assembly 35 progresses toward the deployed position, the tension members 62 hold the latching elements 101 in their "non-locking" position. As with the prior embodiment, once the horizontal bar 36 reaches its resting position at the rear of the container body 30, as shown in FIG. 11, the continued deployment of the tarp 60 allows the tarp to "relax" or "bunch". As this tarp tension decreases, the tension straps are allowed to move rearward as the weight latching element causes it to pivot under the force of gravity. The when the horizontal bar of the bail arm assembly is at the end of its stroke, the weight of the locking mechanism, and more particularly the latching element 101, causes the hook 102 to pivot from the position shown in FIG. 8, to the intermediate position shown in FIG. 10, to the locking position shown in FIG. 11.

When the bail member assembly 35 is retracted, the tarp 60 is first placed in tension, which in turn places the pull straps 62 in tension as they are resisted by the weight of the latching element 101. As the tarp moves forward to its retracted position, the pull straps move with the tarp until the tarp tension is transmitted through the loops 66 to the tensioning shaft 112 to cause the shaft to pull the link plate 104. Pulling the link plate at the pivot mount 114 position on the plate causes the plate to rotate about the horizontal bar 36. This rotation moves the hook 102 clear of the post 120, thereby unlatching the mechanism 100 from the container body. As the bail member assembly travels further to the front of the truck, the pull straps 62 continue to pull the tensioning shaft, which pivots the latching element 101 further to the position shown in FIGS. 10 and 12 so that the locking mechanism 100 can move freely past the locking post 120.

In a further aspect, the locking screw 109 serves the additional function of preventing the latching element 101 from pivoting too far forward. Thus, as shown in FIG. 10, the locking screw 109, which is fixed to the horizontal bar 36, is contacted at point 110 by the shaft collar 116 carried by the tensioning shaft 112. Alternatively, the locking screw may contact the tensioning shaft itself. As seen in FIG. 10, this contact prevents the latching element 101 from pivoting farther, thus maintaining the center of gravity of the latching element 101 at a position forward of the horizontal bar 36. If the center of gravity moves forward of the bar 36 the force of gravity will tend to cause the tensioning shaft to move inward, thereby rotating the hook portion 102 into a useless position. Forcing the center of gravity to remain rearward of the horizontal bar (i.e., toward the rear of the container) ensures that gravity will always cause the latching element 101 to pivot toward, rather than away from, the locking position shown in FIG. 11.

Figure 12:
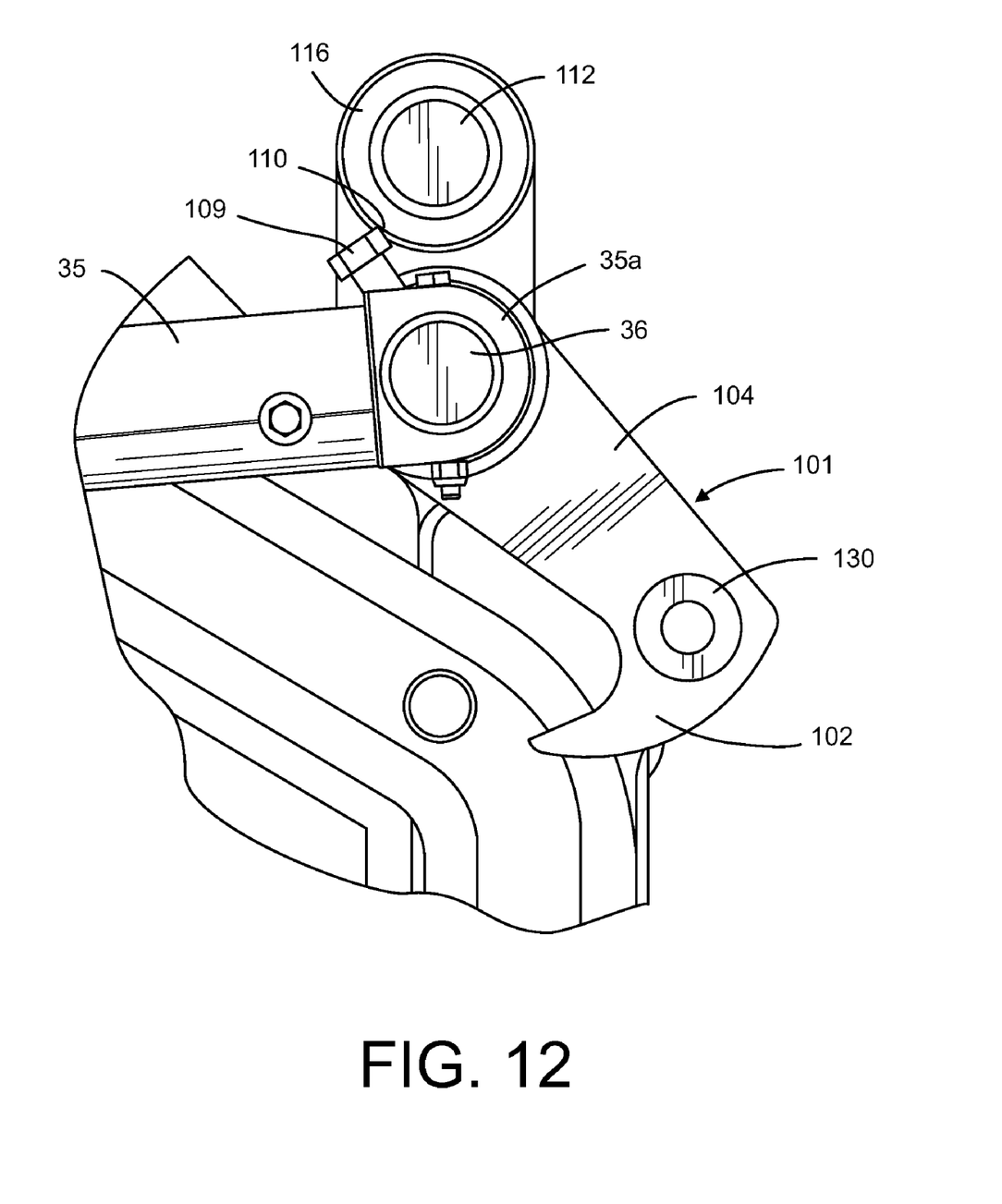
FIG. 12 is an opposite side view of the locking mechanism in the position shown in FIG. 11.

In certain embodiments, the horizontal bar 36 may be provide with a number of resilient bumpers 125 spaced along the length of the bar, as shown in FIGS. 8 and 12. The bumpers avoid a 'clanging' contact with the container body when the bail member assembly reaches its fully deployed position. In addition, the bumpers provide a shock absorption characteristic to the locking mechanism 100 when it is locked to the locking post 120. This characteristic reduces bouncing of the bail member assembly as the vehicle is traveling down the road or over rough terrain, and helps absorb the shock of any excessive movement of the assembly.

The link plate 104 may include a hub 130 projecting from the plate. This hub 130 is arranged to ride on the top rail T (FIG. 8) of the container body 30 when the bail member assembly is passing over the main part of the container body. The hub 130 may project inward, as shown in FIG. 9, when the link plate 104 of the latching element 101 is outboard of the top rail. Alternatively, the link plate may be situated inboard of top rail, in which case the hub may project outward from the link plate 104.

Modifications of the embodiments described above are contemplated. For instance, in one modification, the tension straps 62 may be connected directly to the end of the latching element 101 at the collar 114. In this modification, although the tensioning shaft 112 is eliminated, the tension applied and released by the tensioning straps 62 as the tarp 60 is deployed will be transmitted directly to the latching element 101 to pivot the latching element in the manner necessary to engage and disengage the hook 102 from the locking post 120.

In a further modification, the latching element 101 may be situated inboard of the sides of the container, or may be configured to engage a feature on the back of the container body 30. For instance, the hook 102 may be configured to engage the underside of a ledge spanning the width of the rear of the container.

What is claimed is:

1. A locking mechanism for a cover system covering a container, the cover system having a flexible cover and a deployment mechanism having a horizontal arm spanning the width of the container and carrying one end of the flexible cover, the deployment mechanism movable to an extended position in which the horizontal arm is adjacent one end of the container, said locking mechanism comprising:
- at least one locking element associated with the container; and
- at least one latching element having a latching portion configured to engage said at least one locking element, said latching element pivotably supported on the horizontal arm of the deployment mechanism so that said latching element can pivot to and from a locked position in which said latching portion engages said at least one locking element.

2. The locking mechanism according to claim 1, wherein:
- said at least one locking element is a post fastened to the container; and
- said latching portion of said latching element is a hook configured to engage said post.

3. The locking mechanism according to claim 1, further comprising at least one tensioning member connected between said at least one latching element and the flexible cover.

4. The locking mechanism according to claim 3, wherein said at least one tensioning member is sized and configured to hold the latching element away from the locked position when the cover is in tension and to permit the latching element to pivot toward the locked position when the tension in the cover is decreasing.

5. The locking mechanism according to claim 3, wherein:
- said latching element includes opposite ends and is pivotably supported on the horizontal arm between said opposite ends; and
- said latching portion is defined at one of said opposite ends and said tensioning member is connected to said latching element at the other of said opposite ends.

6. The locking mechanism according to claim 5, further comprising a shaft connected to said latching element at said other of said opposite ends.

7. The locking mechanism according to claim 6, wherein said shaft is pivotably connected to said latching element.

8. The locking mechanism according to claim 6, wherein said tensioning member is connected to said shaft.

9. The locking mechanism according to claim 8, wherein said at least one tensioning member includes an elongated strap attached at one end to the flexible cover and connected at the opposite end to said shaft.

10. The locking mechanism according to claim 9, wherein said opposite end of said elongated strap forms a loop sized to receive the shaft therethrough.

11. The locking mechanism according to claim 10, wherein said elongated strap has a length sized so that said loop extends beyond the end of the cover.

12. The locking mechanism according to claim 10, wherein said loop is adjustable to adjust the length of said elongated strap.

13. The locking mechanism according to claim 9, wherein:
- said at least one locking element includes a pair of posts, one each projecting outward from the container;
- said at least one latching element includes a pair of latch plates, one each pivotably supported adjacent each end of the horizontal arm;
- said latching portion of each of said pair of latch plates is a hook configured to engage a corresponding one of said pair of posts;
- said shaft is connected at each of its opposite ends to a corresponding latching element and extends generally parallel to the horizontal arm; and
- said at least one elongated strap includes a pair of elongated straps, one each attached at said one end to a corresponding one of the opposite sides of the flexible cover and connected at said opposite end to a corresponding one of the opposite ends of said shaft.

14. The locking mechanism according to claim 1, wherein:
- said at least one locking element includes a pair of posts, one each projecting outward from the container;
- said at least one latching element includes a pair of latch plates, one each pivotably supported adjacent each end of the horizontal arm;
- said latching portion of each of said pair of latch plates is a hook configured to engage a corresponding one of said pair of posts.

15. The locking mechanism according to claim 1, further comprising at least one resilient bumper mounted on the horizontal arm and positioned to contact the end of the container when the deployment mechanism is in the extended position.

16. The locking mechanism according to claim 3, wherein said latching element includes opposite ends and is pivotably supported on the horizontal arm at one of said opposite ends, and said latching portion is defined at the other of said opposite ends.

17. The locking mechanism according to claim 16, further comprising a shaft connected to said latching element adjacent said other of said opposite ends.

18. The locking mechanism according to claim 17, wherein said at least one tensioning member includes an elongated strap attached at one end to the flexible cover and connected at the opposite end to said shaft.

19. The locking mechanism according to claim 18, wherein said opposite end of said elongated strap forms a loop sized to receive the shaft therethrough.

20. The locking mechanism according to claim 19, wherein said loop is adjustable to adjust the length of said elongated strap.

21. The locking mechanism according to claim 18, wherein:
- said at least one locking element includes a pair of posts, one each projecting from the container;
- said at least one latching element includes a pair of latch plates, one each pivotably supported adjacent each end of the horizontal arm at each side of the container;
- said latching portion of each of said pair of latch plates is a hook configured to engage a corresponding one of said pair of posts;
- said shaft is connected at each of its opposite ends to a corresponding latching element and extends generally parallel to the horizontal arm; and
- said at least one tensioning member includes a pair of elongated straps, one each attached at said one end to each of the opposite sides of the flexible cover and connected at said opposite end to said shaft.

22. A covering system covering a container having opposite ends, comprising:
- a flexible cover sized to cover the container in a deployed configuration;
- a deployment mechanism having a horizontal arm spanning the width of the container and carrying one end of the flexible cover, said deployment mechanism movable to an extended position in which the horizontal arm is adjacent one end of the container; and
- a locking mechanism including;
  - at least one locking element associated with the one end of the container; and
  - at least one latching element having a latching portion configured to engage said at least one locking element, said latching element pivotably supported on said horizontal arm of said deployment mechanism so that said latching element can pivot to and from a locked position in which said latching portion engages said at least one locking element.

23. The system for covering a container according to claim 22, wherein:
said at least one locking element is a post fastened to said container adjacent the one end of the container; and
said latching portion of said latching element is a hook configured to engage said post.

24. The system for covering a container according to claim 22, wherein said locking mechanism includes at least one tensioning member connected between said at least one latching element and said flexible cover.

25. The system for covering a container according to claim 24, wherein said at least one tensioning member is sized and configured to pivot the latching element away from the locked position when the cover is in tension and to permit the latching element to pivot toward the locked position when the tension in the cover is decreasing.

26. The system for covering a container according to claim 24, wherein, said locking mechanism further includes a shaft connected to said latching element at said other of said opposite ends, wherein said tension member is connected to said shaft.

27. The system for covering a container according to claim 26, wherein said at least one tensioning member includes an elongated strap attached at one end to said flexible cover and connected at the opposite end to said shaft.

28. The system for covering a container according to claim 27, wherein said opposite end of said elongated strap forms a loop sized to receive the shaft therethrough.

29. The system for covering a container according to claim 24, wherein:
said latching element includes opposite ends and is pivotably supported on the horizontal arm between said opposite ends; and
said latching portion is defined at one of said opposite ends and said tension member is connected to said latching element at the other of said opposite ends.

30. A method for locking a deployment mechanism for a flexible cover configured to cover a container, the deployment mechanism including a horizontal arm operable to move the flexible cover to an extended position adjacent one end of the container, said method comprising:
providing a locking element at the one end of the container;
pivotably mounting a latching element to the horizontal arm, the latching element including a latching portion configured to engage the locking element;
advancing the flexible cover toward the extended position;
until the flexible cover reaches the extended position, holding the latching element away from a position in which the latching portion can engage the locking element; and
as the flexible cover approaches the extended position, permitting the latching element to pivot toward the position in which the latching portion can engage the locking element.

31. The method of claim 30, wherein the latching element pivots about the horizontal arm toward the position in which the latching portion can engage the locking element only due to the force of gravity.

32. The method of claim 30, further comprising applying tension to the latching element to hold the latching element away from the position in which the latching portion can engage the locking element while withdrawing the deployment mechanism from the extended position.

\* \* \* \* \*